United States Patent
Stumpf

(10) Patent No.: US 11,458,879 B2
(45) Date of Patent: Oct. 4, 2022

(54) FUEL TRAILER

(71) Applicant: Fuelie Systems, Inc., Lewes, DE (US)

(72) Inventor: Thomas R. Stumpf, Chapel Hill, NC (US)

(73) Assignee: FUELIE SYSTEMS, INC., Lewes, DE (US)

( * ) Notice: Subject to any disclaimer, the term of this patent is extended or adjusted under 35 U.S.C. 154(b) by 364 days.

(21) Appl. No.: 16/753,435

(22) PCT Filed: Oct. 3, 2018

(86) PCT No.: PCT/US2018/054091
§ 371 (c)(1),
(2) Date: Apr. 3, 2020

(87) PCT Pub. No.: WO2019/070800
PCT Pub. Date: Apr. 11, 2019

(65) Prior Publication Data
US 2020/0317109 A1    Oct. 8, 2020

Related U.S. Application Data

(60) Provisional application No. 62/613,965, filed on Jan. 5, 2018, provisional application No. 62/568,665, filed on Oct. 5, 2017.

(51) Int. Cl.
*B60P 3/22* (2006.01)
*B60P 1/48* (2006.01)
(Continued)

(52) U.S. Cl.
CPC .......... *B60P 3/2215* (2013.01); *B01D 17/045* (2013.01); *B01D 35/005* (2013.01);
(Continued)

(58) Field of Classification Search
CPC ....... B60P 3/2215; B60P 3/225; B60P 3/2245; B01D 17/045; B01D 35/005; B01D 39/16; B60D 1/48
(Continued)

(56) References Cited

U.S. PATENT DOCUMENTS 2,732,839 A    1/1956    Elder
2,777,606 A    1/1957    Moore et al.
(Continued)

FOREIGN PATENT DOCUMENTS

GB    2049572 A    12/1980
GB    2086812 A    5/1982
(Continued)

OTHER PUBLICATIONS

JME Ellsworth, "Western Global 500 Gallon ABBI Mobile Refueler UL Transport Tank Trailer With Transfer Pump Package", pp. 1-6, retrieved on Nov. 14, 2018, retrieved from internet: https://www.jmesales.com/western-global-500-gallon-abbi-mobile-refueler-ul-transport-tank-trailer-with-transfer-pump-package/.
(Continued)

*Primary Examiner* — Madeline Gonzalez
(74) *Attorney, Agent, or Firm* — Coats & Bennett, PLLC

(57) ABSTRACT

A fuel trailer configured to store and process fuel. The fuel trailer includes a frame with wheels; a fuel tank mounted to the frame, and a fuel system downstream from the fuel tank to move the fuel from the fuel tank. The fuel system can include filters that remove contaminants from the fuel, pumps to move the fuel, and redundant fuel lines. A dispensing end can be positioned to dispense the fuel to an outside device.

20 Claims, 11 Drawing Sheets

(51) Int. Cl.
  *B01D 35/30* (2006.01)
  *B01D 39/16* (2006.01)
  *B01D 17/04* (2006.01)
  *B01D 35/00* (2006.01)
  *B60D 1/48* (2006.01)

(52) U.S. Cl.
  CPC ............... *B01D 39/16* (2013.01); *B60D 1/48* (2013.01); *B60P 3/225* (2013.01)

(58) Field of Classification Search
  USPC ...... 210/167.01, 167.04, 167.31, 171, 172.1, 210/172.4, 194, 195.1, 196, 335, 455, 210/DIG. 5, 257.1, 712, 416.4, 258; 280/839; 137/899.4
  See application file for complete search history.

(56) References Cited

U.S. PATENT DOCUMENTS

| | | | |
|---|---|---|---|
| 2,826,421 | A | 3/1958 | Mueller |
| 3,050,315 | A | 8/1962 | Kindler et al. |
| 3,645,416 | A | 2/1972 | Main, Jr. |
| 4,007,765 | A | 2/1977 | Bellows |
| 5,494,191 | A | 2/1996 | Benson |
| 5,782,493 | A | 7/1998 | Bolton et al. |
| 6,564,961 | B1 | 5/2003 | Klein |
| 6,923,475 | B1 | 8/2005 | Martin et al. |
| 7,300,073 | B2 | 11/2007 | Bachman |
| 7,475,910 | B1 | 1/2009 | Calonge et al. |
| D759,546 | S | 6/2016 | Van Wyk |
| D759,547 | S | 6/2016 | Van Wyk |
| 9,616,798 | B2 | 4/2017 | Stumpf |
| 2003/0230585 | A1 | 12/2003 | Hagenbuch |
| 2005/0115621 | A1* | 6/2005 | Van Vliet ............... B60P 3/2255 137/899 |
| 2006/0097508 | A1 | 5/2006 | Bachman et al. |
| 2006/0249947 | A1 | 11/2006 | Michael |
| 2007/0000545 | A1 | 1/2007 | Cannon et al. |
| 2010/0015369 | A1 | 1/2010 | Schroder et al. |
| 2013/0328298 | A1 | 12/2013 | Thomas et al. |
| 2014/0103628 | A1 | 4/2014 | De Biasi et al. |
| 2014/0217716 | A1 | 8/2014 | Reynolds et al. |
| 2014/0263085 | A1* | 9/2014 | Mitchell ............... B01D 46/90 210/791 |
| 2018/0025345 | A1 | 1/2018 | Kittoe et al. |
| 2018/0229993 | A1 | 8/2018 | Van Wyk |

FOREIGN PATENT DOCUMENTS

| | | |
|---|---|---|
| WO | 2004009391 A1 | 1/2004 |
| WO | 2005002993 A1 | 1/2005 |
| WO | 2019070832 A1 | 4/2019 |

OTHER PUBLICATIONS

Henrich Fuel Equipment, "Western Global RT20 Transcube Highway Trailer", pp. 1-2, retrieved on Nov. 14, 2018, retrieved from internet: https://henrichinc.com/shop/western-global-transcube-rt20.html.

Fuelpro, "FuelPROTrailers.com Brochure", Jan. 1, 2017, pp. 1-12, retrieved on Nov. 26, 2018, retrieved from internet: https://www.dropbox.com/s/8r5d7a2jlli6llo/FuelPRO%20brochure%20%5B2019%5D%5B4%5D.pdf?dl=0.

Womack Machine Supply Company, "Hydraulic Filter Beta Ratings and the Multi-Pass Test", Jan. 1, 1990, pp. 1-5, retrieved on Mar. 25, 2019, retrieved from internet: https://www.womackmachine.com/engineering-toolbox/data-sheets/hydraulic-filter-beta-ratings-and-the-multi-pass-test/.

Parker Hannifin Corporation, "The Micron Rating for Fluid Filters", pp. 1-3, retrieved on Aug. 26, 2019, retrieved from internet: https://www.parker.com/literature/Racor/Mobile_The_Micron_Rating.pdf.

\* cited by examiner

FUEL TRAILER

RELATED APPLICATIONS

This application claims the benefit of U.S. Provisional Application Nos. 62/568,665 filed Oct. 5, 2017 and 62/613,965 filed Jan. 5, 2018, the disclosures of which are incorporated by reference herein in their entireties.

BACKGROUND

Various fuel devices are known for storing and supplying fuel at a desired location. One example includes a motorized vehicle with an attached fuel storage tank, such as a tanker truck. In use, the vehicle is loaded with fuel and then driven to the desired location where the fuel is dispensed. A similar example is a tank trailer that includes a fuel tank supported on a trailer platform and configured to be towed behind a vehicle. Another example is a fuel container sized to be handled by a user. The container includes an enclosed interior of usually less than a fifteen gallon fuel capacity and includes an exterior handle to facilitate movement. During use, the container is filled with fuel and then lifted and moved by the user to the desired location where fuel is dispensed. Each of these various types of fuel devices has limited application.

SUMMARY

One aspect is directed to a portable fueling trailer that comprises a frame, an axle and wheels attached to the frame, a fuel tank mounted to the frame and that comprises an enclosed interior space to contain fuel, and a fuel system downstream from the fuel tank to move the fuel from the fuel tank. The fuel system comprises: filters each configured to remove contaminants from the fuel; redundant first and second fuel lines that each comprise a pump to move the fuel; a connector downstream from the first and second fuel lines with a pair of inlets to receive the fuel from the first and second fuel lines and a single outlet downstream from the pair of inlets; and a dispensing end positioned downstream from the single outlet.

In another aspect, a first one of the filters is located on the first fuel line and a second one of the filters is located on the second fuel line.

In another aspect, one of the filters is a particulate filter and a second one of the filters is an organic filter, with the particulate filter being positioned upstream from the organic filter.

In another aspect, one of the filters is a coalescing filter to remove water from the fuel.

In another aspect, the first fuel line comprises a first valve and the second fuel line comprises a second valve with each of the first and second valves configured to stop the fuel from moving along the respective fuel line.

In another aspect, a return fuel line extends between the fuel system downstream from the single outlet and the fuel tank with the return fuel line configured to return the fuel to the fuel tank after the fuel has moved through the fuel system.

In another aspect, a valve is positioned at an intersection of the return fuel line and the fuel system with the valve configured to direct the fuel towards one of the dispensing end and the return fuel line.

In another aspect, the fuel system comprises a first section with a single fuel line and a second section with the redundant first and second fuel lines with the first section being spaced from the second section.

In another aspect, an input line connects to the fuel system downstream from the fuel tank and upstream from the plurality of filters with the input line configured to introduce outside fuel into the fuel system.

In another aspect, an input line pump is positioned on the input line to move the outside fuel along the input line and into the fuel system.

In another aspect, a valve is positioned along the fuel system between the fuel tank and the input line with the valve preventing the outside fuel from moving upstream along the fuel system and into the fuel tank.

In another aspect, the frame further comprises a hitch mounted to a front of the frame to pull the portable fueling trailer with a vehicle.

In another aspect, sensors are positioned along the fuel line and the fuel tank; and a control system comprises a processing circuit and a communications interface circuit with the control system configured to receive signals from the sensors and adjust one or more of the pumps to adjust the flow rate of the fuel moving through the fuel system.

In another aspect, the control system is configured to shut down the pump in the first fuel line when a fuel flow rate through the first fuel line is below a predetermined threshold.

In another aspect, the control system is configured to increase a rate of the pump in the second fuel line when the pump in the first fuel line is shut down.

In another aspect, a control system comprising a processing circuit and a communications interface circuit is configured to receive signals from sensors in the fuel system and adjust one or more of the pumps to adjust the flow rate of the fuel moving through the fuel system.

In another aspect, the control system is configured to receive signals from a remote source and in response to the signals move the fuel from the fuel tank and through the fuel system and return the fuel to the fuel tank.

In another aspect, the control system is configured to periodically move the fuel through the fuel system and return the fuel to the fuel tank to maintain the fuel in a usable state.

One aspect is directed to a portable fueling trailer that comprises a frame with wheels, a fuel tank mounted to the frame with the fuel tank comprising an enclosed interior space to contain fuel, and a fuel system to move the fuel from the fuel tank. The fuel system comprises:

first and second filters that remove contaminants from the fuel; redundant first and second fuel lines positioned downstream from the first and second filters with each of the first and second fuel lines having a pump and a third filter configured to remove additional contaminants from the fuel; a connector with a pair of inlets to receive the fuel from the first and second fuel lines and a single outlet downstream from the pair of inlets; and a dispensing end positioned downstream from the connector to dispense the fuel.

In another aspect, the first filter is a particulate filter and the second filter is an organic filter with the first filter being positioned upstream from the second filter.

In another aspect, the third filter is a coalescing filter to remove water from the fuel.

In another aspect, the first fuel line comprises a first valve and the second fuel line comprises a second valve with each of the first and second valves configured to stop the fuel from moving along the respective fuel line.

In another aspect, a return line extends between the fuel system downstream from the single outlet and the fuel tank with the return line configured to return the fuel to the fuel tank that has moved through the fuel system.

In another aspect, a valve is positioned at an intersection of the return line and the fuel system with the valve configured to direct the fuel towards one of the dispensing end and the return fuel line.

In another aspect, an input line connects to the fuel system downstream from the fuel tank and upstream from the filters with the input line configured to introduce outside fuel into the fuel system.

In another aspect, an input line pump is positioned on the input line to move the outside fuel along the input line and into the fuel system.

In another aspect, a valve is positioned along the fuel system between the fuel tank and the input line with the valve preventing the outside fuel from moving upstream along the fuel system and into the fuel tank.

In another aspect, sensors are positioned at the fuel line and the fuel tank; and a control system comprises a processing circuit and a communications interface circuit with the control system configured to receive signals from the sensors and adjust one or more of the pumps to adjust the flow rate of the fuel moving through the fuel system.

In another aspect, the control system is configured to shut down the pump in the first fuel line when a fuel flow rate through the first fuel line is below a predetermined threshold.

In another aspect, the control system is configured to increase a rate of the pump in the second fuel line after the pump in the first fuel line is shut down.

In another aspect, a control system comprises a processing circuit and a communications interface circuit with the control system configured to receive signals from sensors in the fuel system and adjust one or more of the pumps to adjust the flow rate of the fuel moving through the fuel system.

In another aspect, the control system is configured to receive signals from a remote source and in response to the signals move the fuel from the fuel tank and through the fuel system and return the fuel to the fuel tank.

In another aspect, the control system is configured to periodically move the fuel through the fuel system and return the fuel to the fuel tank to maintain the fuel in a usable state.

One aspect is directed to a portable fueling trailer that comprises a frame, an axle and wheels attached to the frame, a fuel tank mounted to the frame with the fuel tank comprising an enclosed interior space to contain fuel, and a fuel system attached to the fuel tank to move the fuel from the fuel tank. The fuel system comprises: a plurality of filters each configured to remove contaminants from the fuel; redundant first and second fuel lines that each comprise a pump to move the fuel; a connector downstream from the first and second fuel lines with a pair of inlets to receive the fuel from the first and second fuel lines and a single outlet downstream from the pair of inlets; and a dispensing end downstream from the connector. Sensors are positioned in the fuel tank and the fuel system. A control system comprises a processing circuit and a communications interface circuit with the control system configured to receive signals from the sensors to adjust one or more of the pumps to adjust the flow rate of the fuel moving through the fuel system.

In another aspect, one or more of the sensors are configured to detect a temperature of the fuel.

In another aspect, the control system is configured to activate the pumps and to move the fuel through the fuel system when the fuel has been stored in the fuel tank for a predetermined time.

In another aspect, the control system is configured to: after receiving a request to dispense fuel, activate the pumps and to move the fuel from the fuel tank and through the fuel system and return the fuel to the fuel tank; and after the fuel is returned to the fuel tank, moving the fuel again through the fuel system and dispensing the fuel through the dispensing end.

In another aspect, the control system is configured to: filter the fuel at a first frequency by moving the fuel from the fuel tank, through the fuel system, and back into the fuel tank; determine that the temperature of the fuel is above a predetermined threshold; and in response to the temperature being above the predetermined threshold, increasing the frequency of filtering the fuel.

One aspect is directed to a method of using a portable fueling trailer. The method comprises: wheeling a fueling trailer to a desired geographic location; moving fuel from a fuel tank in the fueling trailer through a plurality of filters and removing contaminants from the fuel; moving with a first pump a first portion of the fuel through a first fuel line and filtering the first portion of the fuel; while moving the first portion of the fuel through the first fuel line, simultaneously pumping with a second pump a remaining second portion of the fuel through a second fuel line and filtering the second portion of the fuel; moving the first and second portions of the fuel from the first and second fuel lines and into a single fuel line; and dispensing the fuel from the single fuel line.

In another aspect, the method comprises moving the fuel from the fuel tank through the plurality of filters with the first and second pumps and removing the contaminants from the fuel.

In another aspect, the method comprises prior to dispensing the fuel from the single fuel line, moving the fuel from the single fuel line and through a return line and back into the fuel tank.

In another aspect, the method comprises introducing outside fuel into an input line and into the fueling trailer downstream from the fuel tank and upstream from the plurality of filters and moving the outside fuel through the plurality of filters.

In another aspect, the method comprises preventing the outside fuel from moving into the fuel tank prior to moving the outside fuel through the plurality of filters.

In another aspect, the method comprises after wheeling the fueling trailer to the desired geographic location, detaching the fueling trailer from a vehicle and moving the fueling from the fuel tank.

One aspect is directed to a method of using a portable fueling trailer. The method comprises: wheeling a fueling trailer to a desired geographic location; moving fuel from a fuel tank and through a fuel system comprising: moving the fuel through a plurality of filters and removing contaminants from the fuel; moving a first portion of the fuel through a first fuel line and filtering the first portion of the fuel; while moving the first portion of the fuel through the first fuel line, simultaneously moving a second portion of the fuel through a second fuel line and filtering the second portion of the fuel; and moving the first and second portions of the fuel from the first and second fuel lines and into a single fuel line.

In another aspect, the method comprises returning the fuel to the storage tank through an input line that bypasses the plurality of filters and the first and second fuel lines prior to dispensing the fuel through a dispensing end on the single fuel line.

In another aspect, the method comprises determining that the fuel has been in the fuel tank beyond a predetermined time period and moving the fuel from the fuel tank and through the fuel system and then returning the fuel to the fuel tank.

In another aspect, the method comprises sensing one of water and contaminants in the fuel and in response moving the fuel from the fuel tank and through the fuel system.

In another aspect, the method comprises sensing that a temperature of the fuel in the fuel tank exceeds a predetermined level and in response moving the fuel from the fuel tank and through the fuel system.

In another aspect, the method comprises determining that a fuel flow rate of the fuel moving through the fuel system is below a predetermined rate and shutting down a pump in one of the first fuel line and the second fuel line.

In another aspect, the method comprises in response to shutting down the pump in one of the first fuel line and the second fuel line, increasing the speed of the other pump.

In another aspect, the method comprises moving the fuel from the fuel tank and through the fuel system in response to receiving a fueling request.

In another aspect, the method comprises receiving a fueling request from an outside source; determining that a required amount of fuel is available in the fuel tank and a processing time for preparing the fuel for dispensing; transmitting a message to the outside source and beginning to move the fuel from the fuel tank through the fuel system; and dispensing the fuel when the outside source arrives at the portable fueling trailer.

One aspect is directed to a fueling network comprising a plurality of portable fueling trailers and a central controller. The plurality of portable fueling trailers each comprises: a frame; an axle and wheels attached to the frame; a fuel tank mounted to the frame, the fuel tank comprising an enclosed interior space to contain fuel; a fuel system downstream from the fuel tank to move the fuel from the fuel tank with the fuel system comprising: a plurality of filters each configured to remove contaminants from the fuel; redundant first and second fuel lines that each comprise a pump to move the fuel; a connector downstream from the first and second fuel lines with a pair of inlets to receive the fuel from the first and second fuel lines and a single outlet downstream from the pair of inlets; and a dispensing end positioned downstream from the single outlet. The central controller comprises a processing circuit and a communications interface circuit with the control system configured to communicate with each of the portable fueling trailers. The central controller is configured to: receive a fueling request from an outside source; determine which one of the portable fueling trailers is able to provide the fuel to the outside source; and transmit a signal to the outside source indicating the portable fueling trailer that will be supplying the fuel.

In another aspect, the central controller further comprises a communication interface circuitry to send and receive signals with the outside source and with the plurality of portable fueling trailers.

One aspect is directed to a method of supplying fuel to an outside source. The method comprises: receiving a fueling request from an outside source; determining which one of a plurality of portable fueling trailers that are positioned in a network is able to provide the fuel to the outside source. Each of the portable fueling trailers comprises: a frame; an axle and wheels attached to the frame; a fuel tank mounted to the frame, the fuel tank comprising an enclosed interior space to contain fuel; a fuel system downstream from the fuel tank to move the fuel from the fuel tank. The fuel system comprises: a plurality of filters each configured to remove contaminants from the fuel; redundant first and second fuel lines that each comprise a pump to move the fuel; and a connector downstream from the first and second fuel lines with a pair of inlets to receive the fuel from the first and second fuel lines and a single outlet downstream from the pair of inlets; and a dispensing end positioned downstream from the single outlet. The method also comprises: transmitting a signal to the outside source indicating the portable fueling trailer that will be supplying the fuel; receiving fuel dispensing information from the portable fueling trailer indicating an amount of fuel that is dispensed to the outside source; and updating fuel information of the portable fueling trailer.

In another aspect, the method comprises monitoring an amount of fuel at each of the portable fueling trailers.

In another aspect, receiving the fueling request from the outside source comprises receiving at least one of an amount of needed fuel, a time when the fuel is needed, and a current location of the outside source.

In another aspect, determining which one of the plurality of portable fueling trailers is able to provide the fuel to the outside source comprises determining which one of the portable fueling trailers is closest to the outside source when the fueling request is received.

In another aspect, the method comprises sending a passcode to the outside source to activate the portable fueling trailer.

DETAILED DESCRIPTION

The present application is directed to a fuel device configured to store and process fuel. One device is a trailer. Other designs can include different types of devices that are configured to transport and store fuel. The processing of the fuel can include one or more filtration steps each configured to remove contaminants from the fuel. A control circuit controls the flow of fuel through the device. The device is portable such that it can be hauled behind a vehicle, stored within a cargo bed of a vehicle, lifted and moved by a helicopter or other aerial vehicle, and various other movements.

Figure 1:
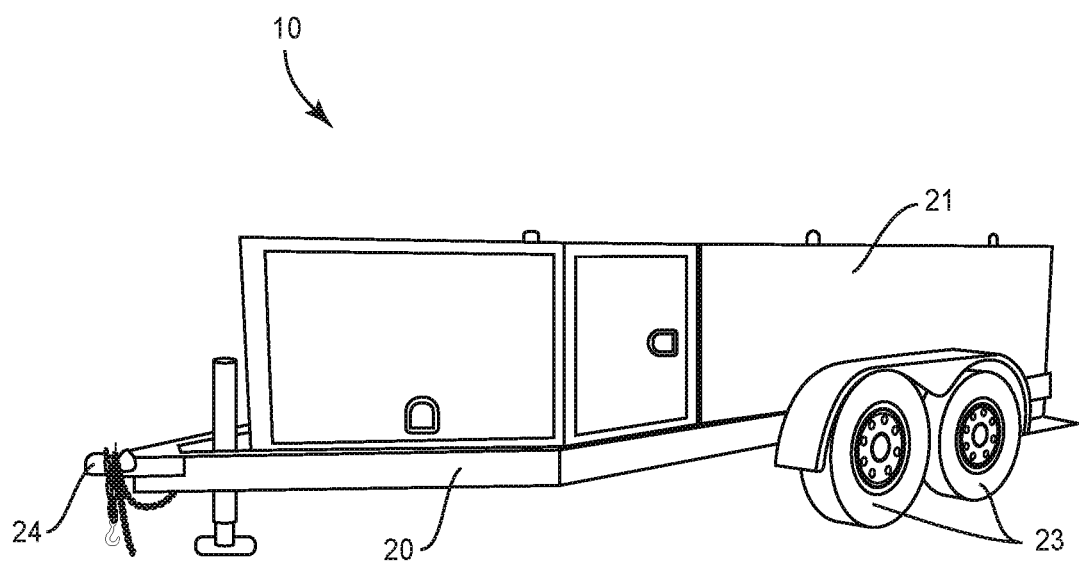
FIG. 1 is a perspective view of a fuel trailer.

FIG. 1 illustrates a fueling trailer 10. This trailer 10 includes a frame 20 that supports the fuel components and an exterior body 21 that extends around the fuel components. The trailer 10 includes one or more axles and wheels 23 for transporting. A hitch 24 can be positioned on the frame 20 for pulling the trailer 10 behind a vehicle.

The components can include a fuel tank 30 that forms a portion of the exterior body 21 of the fueling trailer 10. A remaining portion of the exterior body 21 can be formed by a separate housing that extends around and protects components positioned within the interior of the housing.

Figure 2:
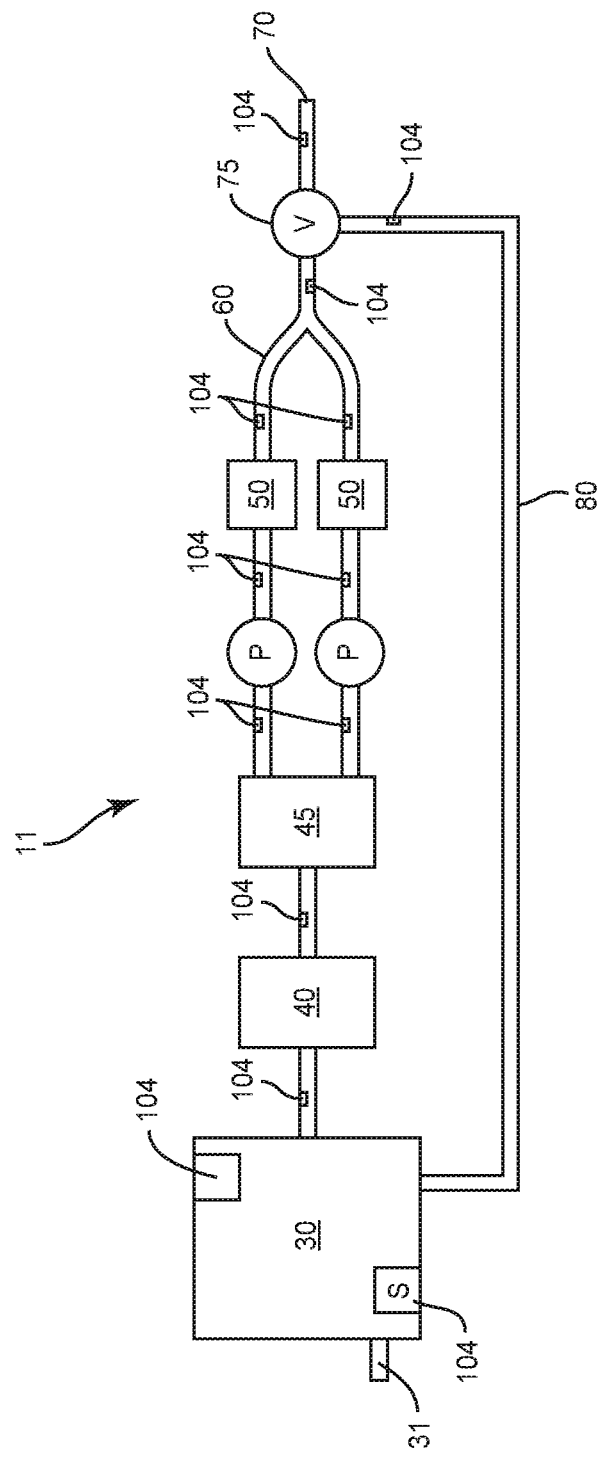
FIG. 2 is a schematic diagram of a fuel system within a fuel trailer.

FIG. 2 illustrates schematically the fuel components of a fuel system 11 of the trailer 10. A tank 30 is configured to contain fuel that can be dispensed by the trailer 10. The tank 30 can include a variety of sizes depending upon the context of use. In one aspect, the tank 30 is sized such that the trailer 10 can be pulled by a vehicle without requiring a Commercial Driver License. An outlet 31 can extend from the tank 30 to remove contaminants in the fuel. The outlet 31 can be positioned at various locations on the tank 30, including at a lower section of the tank (as illustrated in FIG. 2) and at a higher section of the tank. Further, multiple outlets 31 can extend from the tank 30. In one use, the outlet 31 can be used to remove water that has accumulated in the fuel.

Another outlet from the tank 30 feeds the fuel into a first filter 40. This filter 40 removes a first amount of contaminants in the fuel. In one aspect, the filter 40 is an 80-micron particulate filter. The filter 40 can remove various contaminants, including but not limited to scale, mud, and debris.

Fuel from the filter 40 is then fed into a second filter 45. The second filter 45 removes a second amount and/or a second type of contaminants from the fuel. In one aspect, the second filter 45 is an organic filter. The filter 45 can be configured to remove contaminants including but not limited to bacteria and mold.

One or more pumps P are positioned to move the fuel through the fuel system 11. The pumps P can be configured to provide a fuel flow rate as needed to move the fuel through the fuel system 11. The pumps P can be the same or different, and can provide for the same or different flow rates.

Filters 50 are configured to remove additional contaminants from the fuel that were not previously removed. In one aspect, the filters 50 are separating filters that separate water from the fuel. The filters 50 can include a coalescing filter element that removes the water from the fuel. The filters 50 can also be water absorbing filters that absorb the water in the fuel.

Fuel from the filters 50 moves through a Y-connector 60 and includes a single outlet that forms a single stream. The fuel can then be output through a dispensing end 70 that can be equipped with a hose and nozzle. The fuel can also be directed by a valve 75 through a line 80 and back into the tank 30.

One or more sections of the fuel system 11 can include redundant components. In the event a section of the system 11 fails, fuel can still be processed through the remaining section. FIG. 2 includes the redundancy beginning downstream from the filter 45. A first line receives fuel and moves the fuel through a pump P and filter 50. A second line also receives fuel from the filter 45 and includes a pump P and filter 50. In the event that one of the components (e.g., a pump P or a filter 50) fails, the line can be shut down and processing of fuel can continue on the remaining line. The lines can include one or more valves that can be shut to prevent the flow of fuel thus shutting down the line. The applicable pump P can be stopped to stop the flow of fuel through the failed line.

Figure 3:
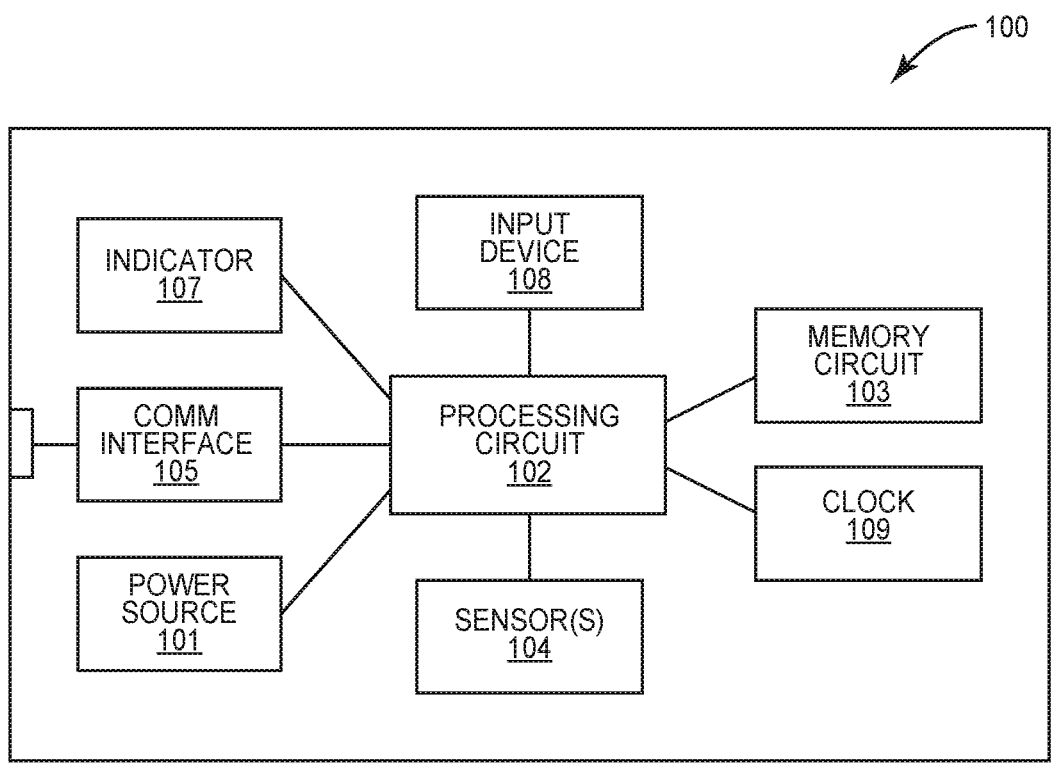
FIG. 3 is a schematic diagram of a control system within a fuel trailer.

A control system 100 oversees the movement of fuel through the fuel system 11. As illustrated in FIG. 3, the control system 100 includes a processing circuit 102 that is communicatively coupled to one or more other components of the trailer 10, e.g., via one or more buses. The processing circuit 102 can include one or more general-purpose and/or dedicated processors, including (but not limited to) one or more microprocessors, microcontrollers, application-specific integrated circuits (ASICs), field-programmable gate arrays (FPGAs), digital signal processors (DSPs), and/or other circuitry configured with appropriate software and/or firmware to control the movement of the fuel through the trailer 10 according to program instructions stored in a memory circuit 103. The memory circuit 103 stores processing logic, programming code, and operational information for use by the processing circuit 102. The memory circuit 103 can include volatile memory, non-volatile memory, or both, according to various embodiments. One or more sensors 104 are positioned within the trailer 10 and are configured to determine aspects about the fuel and/or the fuel system 11.

A communication interface 105 is configured to exchange signals with one or more remote sources. For example, the communication interface 105 can comprise an electronic transmitter for transmitting radio, electrical, and/or optical signals, and can further comprise an electronic receiver for receiving radio, electrical, and/or optical signals. In some embodiments, the communication interface 105 is configured to support short-range wireless signaling via BLUETOOTH, RFID, ZIGBEE, and/or WIFI. The communication interface 105 can additionally or alternatively be configured to support long-range wireless communication via cellular- and/or satellite-based signaling. The communication interface 105 can additionally or alternatively be configured to support signaling over a wired connection, such as a serial, USB, micro USB, FIREWIRE, Lightning, and/or Thunderbolt connection. There can be more than one communications interface 105. In such embodiments that support radio communication, an antenna (not illustrated) can be configured for the transmitting and receiving of wireless signals to and from the remote sources.

A clock 109 is configured to measure various timing aspects of the fuel in the fuel system 11. The control system 100 can further include one or more indicators 107, such as light-emitting diodes (LEDs) or LCD displays, for indicating various data items to a user. For example, the indicator 107 could be used to indicate the amount of fuel within the tank 30, the amount of time since the last re-polishing event, etc. An input device 108 such as a keypad, touchpad, switch, dial, buttons, track-ball, etc. can be included to receive inputs from an operator. The control system 100 can include a separate power source 101 such as a battery for powering one or more of the components. The control system 100 can additionally or alternatively receive power from an external source. In one design, the trailer 10 is equipped with solar power capability that includes one or more solar panels that convert light energy. The power can be harnessed and used to operate one or more components of the control system 100 and/or the fuel system 11.

The sensors 104 can be positioned at various locations throughout the fuel system 11. The sensors 104 can detect various aspects of the fuel and/or fuel system 11, including but not limited to the flow rate, amount of fuel in the tank 30, status of one or more of the filters 40, 45, 50, and contaminants in the fuel. Signals from the sensors 104 are received by the processing circuit 102 that calculates the various values. One or more of the sensors 104 can also detect environmental conditions of the environment and/or the fuel. This can be used by the processing circuit 102 to determine fuel status. Detected aspects include but are not limited to the temperature at the trailer 10, the temperature within the fuel tank 30, the temperature of the fuel at one or more locations along the fuel system 11, and the humidity at the trailer 10.

The processing circuit 102 can polish the fuel in the event the fuel has been stored within the tank 30 for an extended period of time. For example, this can occur when the trailer 10 is positioned at a remote location such as a remote outpost in which the demand for fuel is low. Another example is when the trailer 10 is filled with fuel and positioned in preparation for an event (but not yet in use), such as for emergency management scheduling. One specific example is a trailer 10 that stores fuel and is positioned in the field in anticipation of a possible hurricane strike. Another example is a trailer 10 with fuel that is housed at a relatively remote airport that does not see regular air traffic.

The trailer 10 can be configured to periodically move the fuel through the fuel system 11. This maintains the fuel in a usable state for when it is needed. The trailer 10 can move the fuel on a regular basis (e.g., every day, every week), after the fuel temperature has been elevated above a predetermined threshold, as well as immediately before a fueling event.

Figure 4:
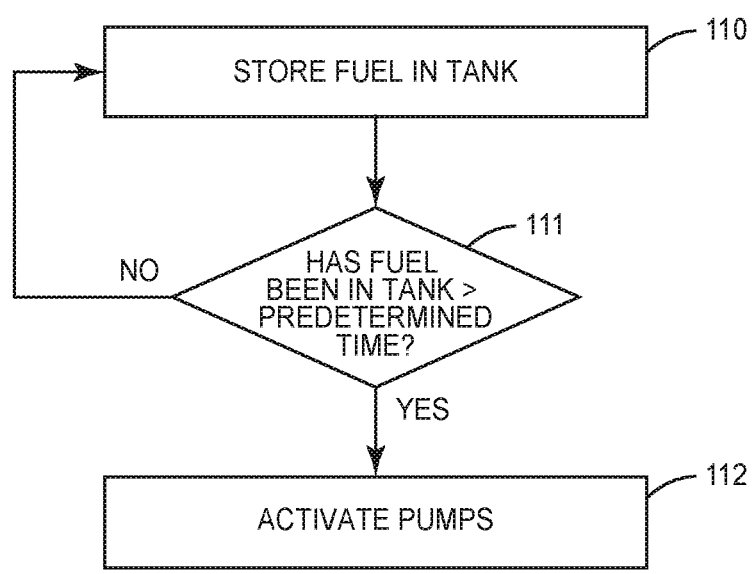
FIG. 4 is a flowchart diagram of a method of dispensing fuel from the trailer.

FIG. 4 illustrates a method of moving fuel through the fuel system 11. Initially, the fuel is stored in the tank 30 (block 110). The processing circuit 102 monitors the length of time that the fuel has been in the tank 30 and determines whether it exceeds a predetermined threshold (block 111). The threshold can vary depending upon different factors. In one embodiment, the threshold becomes smaller relative to the amount of time that the fuel has been stored in the tank 30 (i.e., a longer threshold when the fuel is originally stored in the tank 30, and a smaller threshold after the fuel has been in the tank 30 for a period of time). The time can also depend upon environmental conditions. For example, elevated temperatures at the trailer 10 and/or of the fuel can result in more frequent fuel movement through the fuel system 11. When the processing circuit 102 determines the length of time exceeds the threshold, the processing circuit 102 activates the pumps P and moves the fuel through the fuel system 11. The valve 75 downstream from the filters is positioned such that the fuel that has been moved and filtered through the system 11 is returned via the return line 80 to the tank 30. One or more sensors 104 along the fuel system 11 detect the amount of fuel and/or flow rate of the fuel moving through the fuel system 11. The processing circuit 102 receives the signals and determines how long to move the fuel through the system. Moving the fuel through the fuel line removes impurities from the fuel and maintains the fuel in a useful condition such that the fuel is ready to be dispensed when necessary. The processing circuit 102 can be configured to periodically move a predetermined amount of fuel through the fueling system 11. The processing circuit 102 can also be configured to move the fuel through the fuel system 11 until one or more sensor readings indicate that the fuel is in a predetermined condition.

Figure 5:
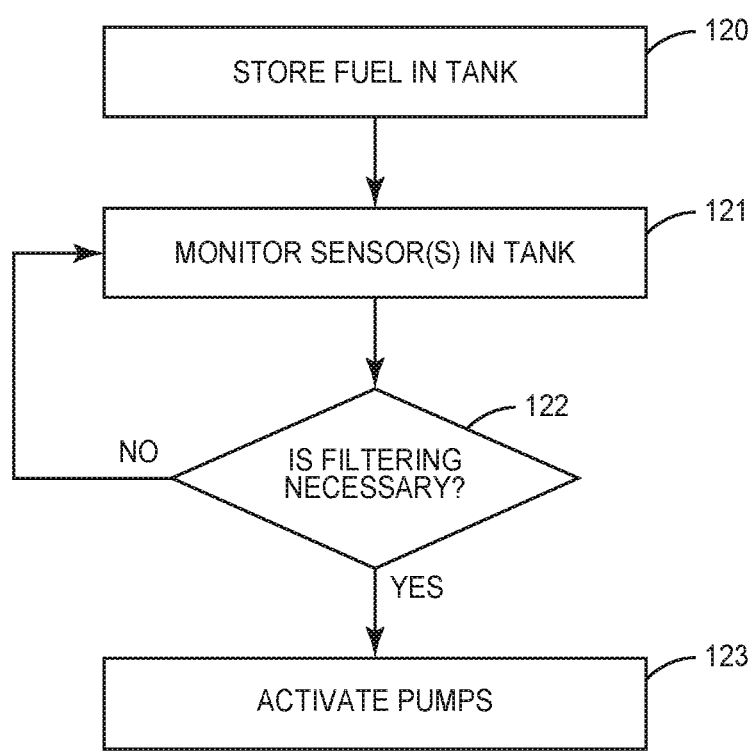
FIG. 5 is a flowchart diagram of a method of dispensing fuel from the trailer.

FIG. 5 illustrates another method of moving fuel through the fuel system 11. The fuel is initially stored in the tank 30 (block 120). One or more sensors 104 in the tank 30 detect the condition of the fuel (block 121). This can include detecting a variety of different aspects, including but not limited to water and/or other debris in the fuel, and the temperature of the fuel. Monitoring of the fuel can be continuously performed, or can be performed on an intermittent basis. When the processing circuit 102 determines that one or more of the monitored aspects indicate that the fuel requires filtering (block 122), the processing circuit 102 activates the pumps P and moves the fuel through the fuel system 11 (block 123). This determination can include but is not limited the fuel having more than a predetermined amount of contaminants and the fuel temperature being above a predetermined threshold. After moving through the fuel system 11, the fuel is directed at the valve 75 into the return line 80 and moved back into the tank 30.

One or more sensors 104 detect the amount of fuel that is moved through the fuel system 11. The processing circuit 102 receives the signals and determines whether to continue moving the fuel through the fuel system 11. This can include moving a predetermined amount of fuel through the fuel system 11, or sensor readings that indicate the fuel being at or above a predetermined threshold.

Figure 6:
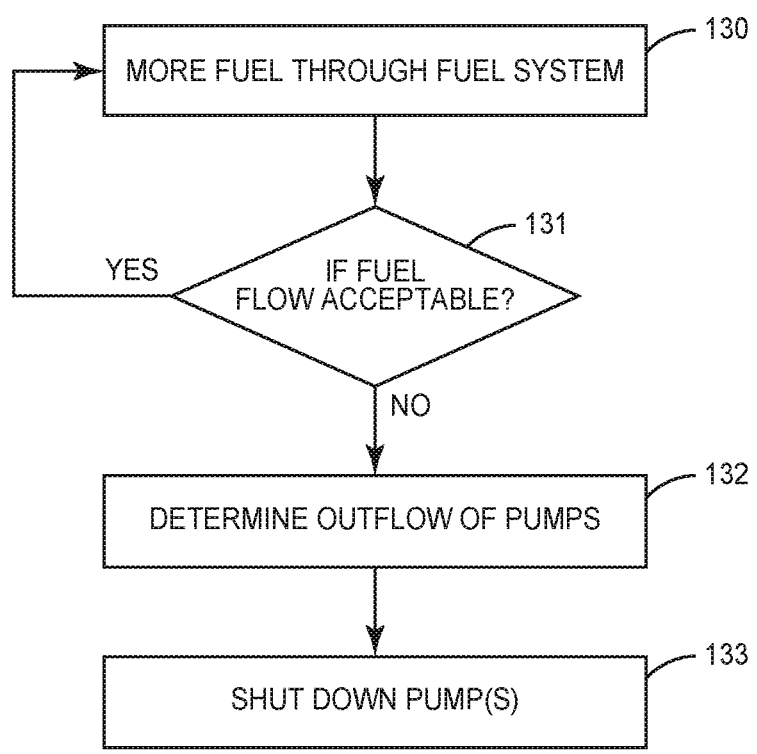
FIG. 6 is a flowchart diagram of a method of dispensing fuel from the trailer.

The processing circuit 102 controls the movement of the fuel through the fuel system 11. This can occur during dispensing of the fuel through the dispensing end 70 or returning the fuel to the tank 30 through the return line 80. FIG. 6 illustrates a method of moving the fuel through the fuel system 11. As the fuel is moved through the fuel system 11 (block 130), the processing circuit 102 receives signals from one or more of the sensors 104 within the fuel system 11. Based on these signals, the processing circuit 102 determines the fuel flow rate through the fuel system 11 (block 131). This can include the rate at one or more locations along the fuel system 11 and/or the rate at which fuel is being dispensed through the dispensing end 70. When the fuel flow is at or above a predetermined threshold, the fuel movement continues. When the fuel flow is not acceptable, the processing circuit 102 determines the outflow of the pumps P (block 132). This can include determining the movement of fuel upstream and downstream from the pumps P, the operational speed of the pumps P, or other manner to determine how effectively the pumps P are moving the fuel. The processing circuit 102 can adjust the speed of one or more of the pumps P to obtain the acceptable fuel flow rate. The processing circuit 102 can also shut down one or both pumps P (block 133). When one pump P is shut down, the fuel moving through the fueling system 11 is limited to the remaining operational fuel line(s). The processing circuit 102 can increase the speed of the one or more operational pumps P to increase the output through the fueling system 11.

Figure 7:
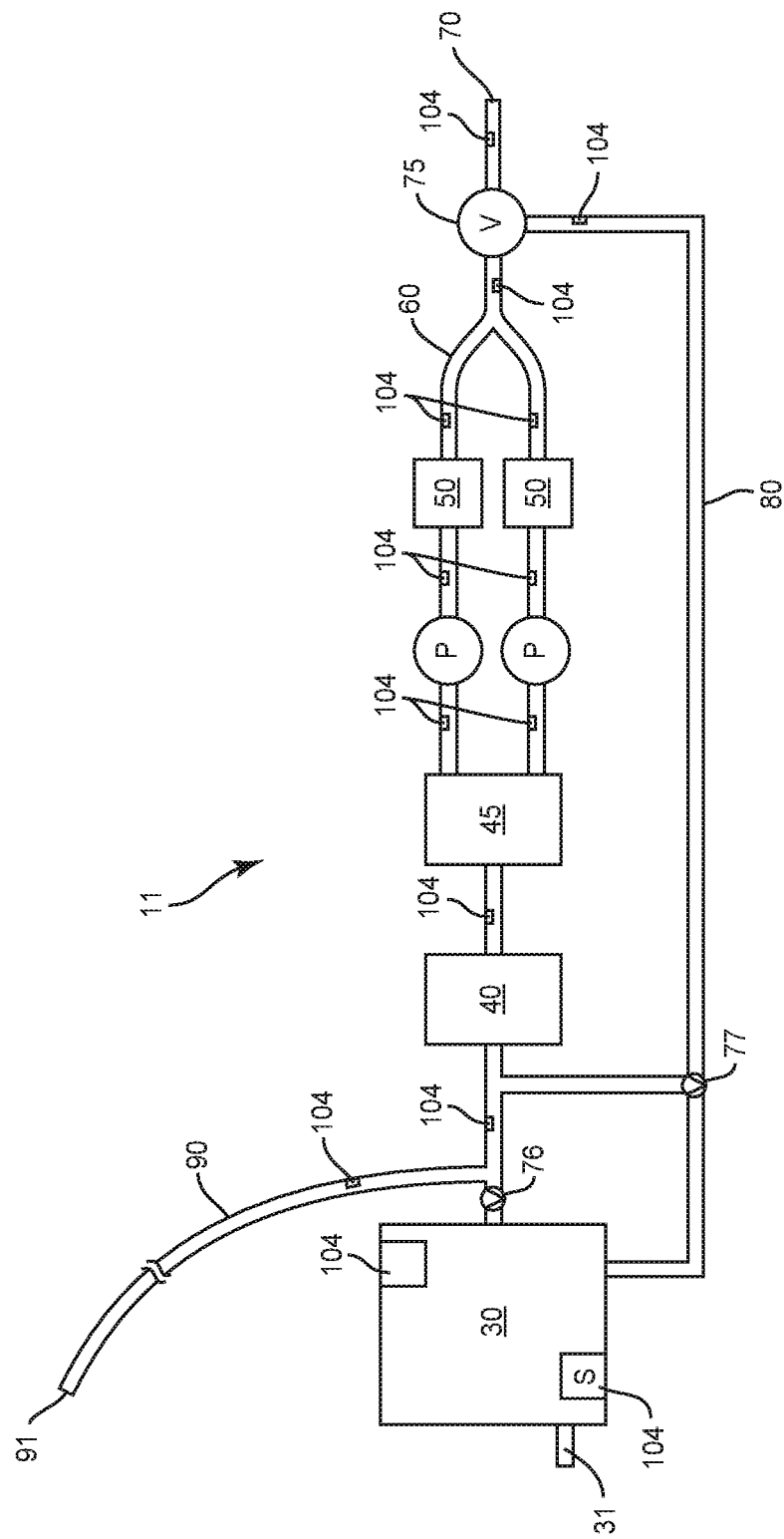
FIG. 7 is a schematic diagram of a fuel system that includes an input line to input fuel from a remote source.

The trailer 10 can also process fuel from other sources. FIG. 7 includes an input line 90 that is positioned downstream from the tank 30 and includes a distal end 91 that can be inserted or otherwise connected to a remote fuel source. Fuel from this source is pulled into the input line 90 and processed through the fuel system 11 as explained above. The trailer 10 can include a pump P along the input line 90 to pump the fuel from the remote source into the input line 90. The other pumps along the fuel system 11 can also be used to draw the fuel into fuel system 11. Further, one or more valves 76 are positioned between the input line 90 and the tank 30 to prevent fuel from directly entering into the tank 30 from the remote source prior to filtering. Further, the valve 75 downstream from the filters can be positioned to prevent the processed fuel from the remote source from being moved through the line 80 and into the tank 30.

The sensors 104 detect the fuel entered through the input line 90. This can include the amount of fuel entered into the fuel system 11 and/or contaminants that are in the fuel. Further, one or more sensors 104 can be positioned along the input line 90 to detect the fuel prior to entry into the fuel system 11. In one design, the processing circuit 102 receives the signals and determines the contaminants in this fuel. In the event the contaminants are above a threshold amount, the processing circuit 102 can stop the inputting and prevent additional fuel from being input into the fuel system 11. This can include shutting off the one or more pumps P.

In one design, the processing circuit 102 can determine that additional filtering is required of the fuel that is being input through the line 90. This can be based on readings from one or more sensors 104 positioned downstream from the input line 90. The fuel can be diverted at the valve 75 at the downstream end of the fuel system 11 and into the return line 80. Valve 77 located along the return line 80 can direct the fuel into the fuel system 11 downstream from the tank 30 for additional filtering. This further prevents the fuel that needs additional processing from being input into the fuel tank 30 and potentially contaminating the stored fuel.

The processing circuit 102 is configured to communicate with vehicles in need of fuel. This can include communications with incoming vehicles, such aircraft in the area in need of fuel or an approaching ground vehicle. When necessary, the processing circuit 102 can begin necessary prep work for the fuel to be ready for dispensing while the vehicle is approaching. The fuel is then ready for dispensing once the vehicle arrives at the trailer 10.

Figure 8:
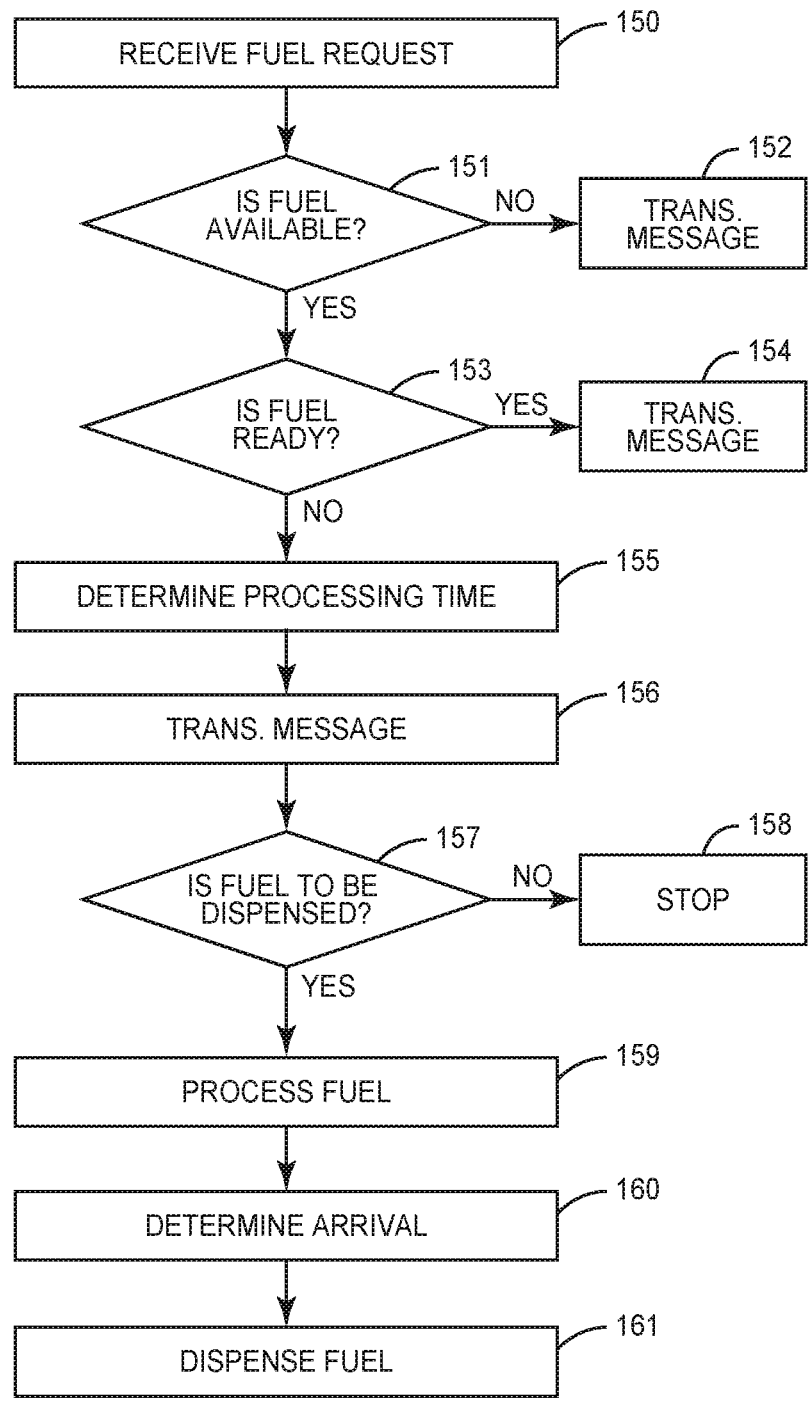
FIG. 8 is a flowchart diagram of a method of dispensing fuel from the trailer.

FIG. 8 illustrates steps performed by the processing circuit 102 upon receiving a request for fuel (block 150). The request includes the amount of fuel and the time when the fuel is needed by the vehicle. For example, an incoming vehicle can request the fuel for a future time, such as for a day in the future. Alternatively, the vehicle can request fuel based on the amount of time it will take the vehicle to travel to the trailer 10 (e.g., the vehicle is in the air and is ten minutes away from the trailer 10). The processing circuit 102 determines whether the requested amount of fuel is available (block 151). If the fuel is not available, a response is transmitted to the vehicle indicating that the fuel is not available (block 152). If the fuel is available, the processing circuit 102 determines whether the fuel is ready for dispensing (block 153). This can include if the fuel has not been moved through the fuel system 11 within a predetermined amount of time and/or a sensor reading. If the fuel is ready, a response is transmitted to the vehicle (block 154).

If the fuel is not ready for dispensing, the processing circuit 102 determines the amount of time necessary to prepare the fuel (block 155). This can include the amount of time necessary to move the fuel through the fuel system 11. The time when the fuel is available for dispensing is transmitted to the vehicle (block 156) who responds with confirmation that the fuel is needed or that the fuel is not needed (block 157). If the fuel is not needed, the trailer 10 stops (block 158). If the fuel is needed, the fuel is moved through the fuel system 11 (block 159). This can include moving the fuel through the fuel system 11 a predetermined number of times. This can also include processing the fuel until readings from one or more sensor 104 indicate that the fuel is in condition for dispensing.

The processing circuit 102 determines that the vehicle has arrived at the trailer 10 (block 160). This can include a person entering a passcode into the input device 108 of the control system 100, or activating the fuel system 11. The fuel is then dispensed through the dispensing end 70 (block 161).

The trailer 10 can be configured such that the fuel is maintained in a ready state. This includes the fuel being periodically moved through the fuel system 11. This movement can occur on a scheduled basis, such as every day, week, etc., or can occur when the processing circuit 102 determines this is necessary based on readings from one or more sensors 104. As the fuel is in a ready state, the processing circuit 102 can determine just whether the requested amount of fuel is available to a vehicle when a fuel request is received. It is not necessary for the processing circuit 102 to determine the state of the fuel.

Figure 9:
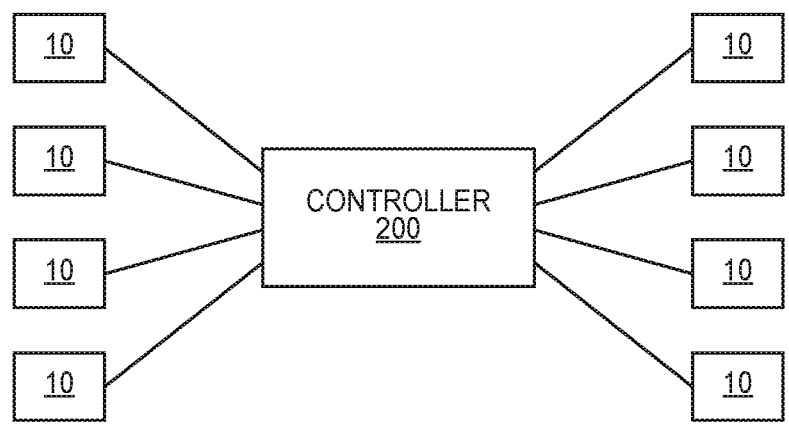
FIG. 9 is a schematic diagram of a fuel network that includes a controller and trailers.

The trailer 10 can be configured to receive fuel requests directly from vehicles. The trailer 10 can also be configured as part of a larger network of trailers 10 that extend over an enlarged area. A central controller 200 is configured to communicate with the trailer 10. The central controller 200 can simply monitor the trailer 10 or can schedule fuel activities of the trailer 10. FIG. 9 illustrates a network that includes the controller 200 that is in communication with multiple trailers 10, e.g., directly or via one or more routers, gateways, switches, hubs, firewalls, and/or signaling mediums (not shown) capable of supporting the communication. The trailers 10 can be spread out about an enlarged geographic area to facilitate fuel options that are available to vehicles.

Figure 10:
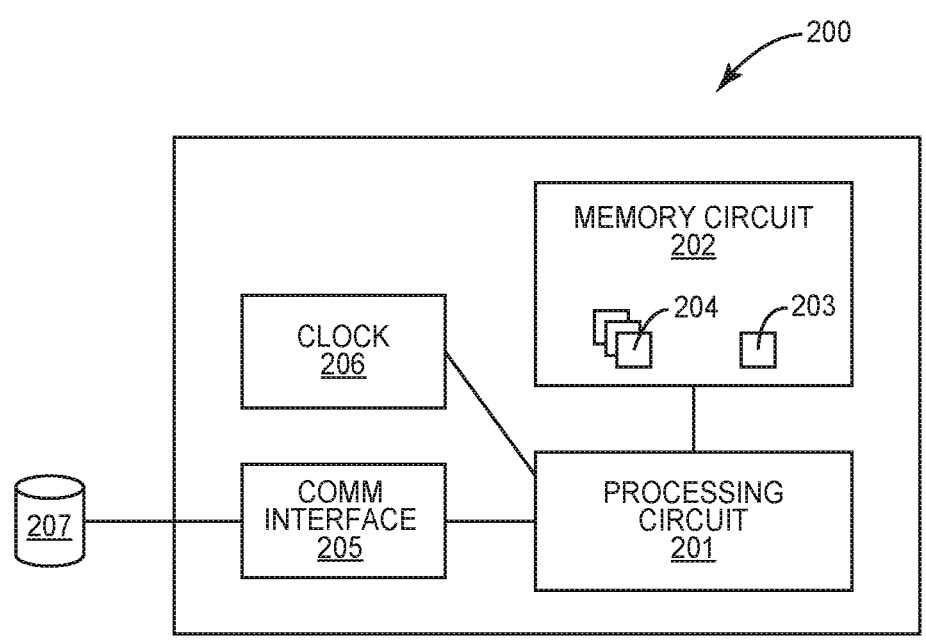
FIG. 10 is a schematic diagram of a control system of a controller.

FIG. 10 illustrates a controller 200. The controller 200 includes one or more processing circuits 201 that can include one or more microprocessors, microcontrollers, Application Specific Integrated Circuits (ASICs), field-programmable gate arrays (FPGAs), digital signal processors (DSPs), and/or other circuitry configured with appropriate software and/or firmware to control the dispensing of fuel throughout the network of trailers 10. A computer readable storage medium (shown as memory circuit 202) stores data and computer readable program code that configures the processing circuit 201 to implement the various monitoring techniques. Memory circuit 202 is a non-transitory computer readable medium, and can include various memory devices such as random access memory, read-only memory, and flash memory. A control application 203 can be stored in the memory circuit 202 that, when run by the processing circuit 201, controls the operation of the controller 200. Vehicle profiles 204 can be stored in the memory circuit 202 and can include information about the vehicles, such as account information, historic information about previous fueling, maintenance, etc. A database 207 is stored in a non-transitory computer readable storage medium (e.g., an electronic, magnetic, optical, electromagnetic, or semiconductor system-based storage device). The database 207 can be remote relative to the processing circuit 201 (as shown), or included within the memory circuit 202.

A communication interface 205 is configured to exchange signals with one or more vehicles and trailers 10. The communication interface 205 can comprise an electronic transmitter for transmitting radio, electrical, and/or optical signals, and can further comprise an electronic receiver for receiving radio, electrical, and/or optical signals. In some embodiments, the communication interface 105 is configured to support short-range wireless signaling via BLUETOOTH, RFID, ZIGBEE, and/or WIFI. The communication interface 205 can additionally or alternatively be configured to support long-range wireless communication via cellular- and/or satellite-based signaling. The communication interface 205 can additionally or alternatively be configured to support signaling over a wired connection, such as a serial, USB, micro USB, FIREWIRE, Lightning, and/or Thunderbolt connection. There can be more than one communications interface 205. In such embodiments that support radio communication, an antenna (not illustrated) can be configured for the transmitting and receiving of wireless signals to and from the remote sources. The controller 200 can also include a clock 206 to measure various timing aspects.

The communication interface 205 can include a web interface for users to access their account and obtain various information. The web interface can support a website through which the contents of the database 207 are accessible. In one or more embodiments the web interface provides browser-based access to the contents of the database 207. The different users can login to the browser-based interface and access the pertinent usage information as well as schedule fuel dispensing. The browser-based interface can support well-known browsers such as Internet Explorer and Mozilla Firefox, Safari, Chrome.

Alternatively, the different users can obtain information from the database 207 using one or more Application Programming Interfaces (APIs) through a user device. Also, in one or more embodiments the web interface supports access to the database 207 using web services in addition to, or as an alternative to, the browser-based interface.

The controller 200 can monitor the status of the one or more trailers 10. For each trailer 10, this can include monitoring the amount of fuel, the amount and times of dispensed fuel, and information about the fuel (e.g., recent fuel contamination results based on sensor readings, when the fuel has been moved through the fuel system 11, etc). The controller 200 can also track when fuel has been added to the trailer 10 during a refueling event.

The controller 200 can also control the coordinated activities of the network of trailers 10. The controller 200 can receive fuel requests from the vehicles and schedule the trailers 10 for fueling. This can include the controller 200 monitoring the status and the amount of fuel at the trailers 10. Based on this information, the controller 200 is able to direct the vehicles to one of the trailers that is able to provide the fuel.

Figure 11:
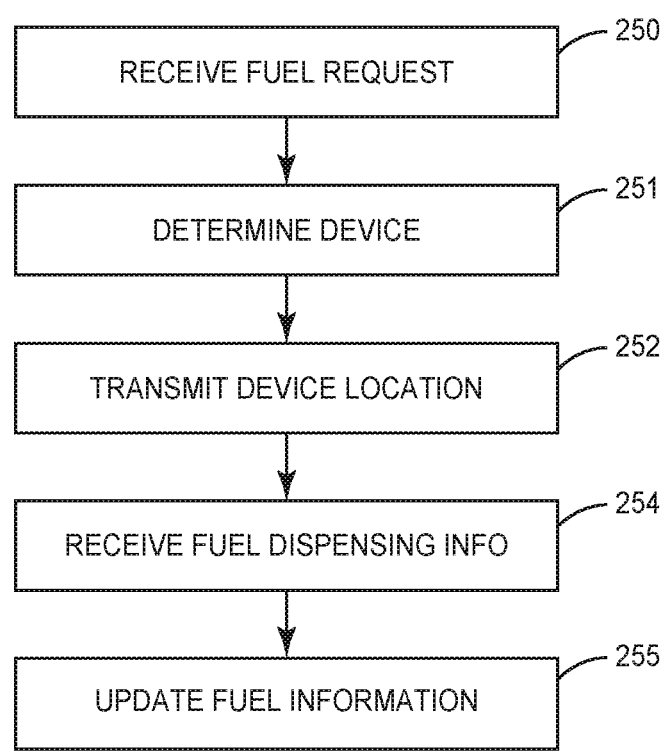
FIG. 11 is a flowchart diagram of a method performed by a controller of coordinating dispensing of fuel from a trailer to a vehicle.

FIG. 11 illustrates a method of a controller 200 coordinating the fueling process. The controller 200 initially receives a request for fuel from a vehicle (block 250). The request can include one or more of an amount of needed fuel, a time when fuel is needed, and a current location of the vehicle.

The controller 200 determines which trailer 10 to direct the vehicle to for dispensing of the fuel (block 251). This location can be based on the location of the vehicle when the request is received and the amount of fuel requested. The controller 200 can determine the closest trailer 10 to the vehicle at the time the request was received. The controller 200 can also determine a more distant trailer 10, such as one with a larger fuel capacity in the event additional fuel could be necessary. The location of the trailer 10 is then transmitted to the vehicle (block 252). This can include the geographic location as well as any particular instructions for reaching the vehicle. This can also include specific information to dispense the fuel, such as a passcode to activate the fueling system 11 to dispense the fuel.

After the fuel has been dispensed to the vehicle, the controller 200 receives dispensing information (block 254). This information can be received from the trailer 10 and/or the vehicle that received the fuel. The information can include the amount of dispensed fuel, the time the fuel was dispensed, etc. The controller 200 receives the information and updates the fuel information about the trailer 10 for future purposes (block 255).

When the amount of fuel remaining in a trailer 10 falls below a predetermined amount, the controller 200 can schedule additional fuel to be delivered to the trailer 10. In this manner, the controller 200 is able to maintain the full network of usable trailers 10 that are available for fuel.

The controller 200 can also monitor the condition of the fuel system 11 within the trailer 10. This can include the length of time the various components have been in use in the trailer 10, and the amount of fuel that has been filtered by the fuel system 11. The controller 200 can also receive signals from one or more of the sensors 104. The controller 200 can use this information to schedule maintenance of the trailer 10 as necessary. In the event the controller 200 determines an issue, the controller 200 can place the trailer 10 out of service and prevent fuel dispensing until the issue has addressed by a technician.

Different devices 10 can be used to store and transport fluid according to aspects of this disclosure. A trailer 10 is one example of a device 10. Another device 10 includes a skid device that includes rails or a platform on the bottom that contacts against and is pulled over the ground.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention can be carried out in other specific ways than those herein set forth without departing from the scope and essential characteristics of the invention. The present embodiments are, therefore, to be considered in all respects as illustrative and not restrictive.

The invention claimed is:

1. A portable fueling trailer comprising:
   a frame;
   an axle and wheels attached to the frame;
   a fuel tank mounted to the frame, the fuel tank comprising an enclosed interior space to contain fuel;
   a fuel system downstream from the fuel tank to move the fuel from the fuel tank, the fuel system comprising:
      a plurality of filters each configured to remove contaminants from the fuel;
      redundant first and second fuel lines that each comprise a pump to move the fuel; and
      a connector downstream from the first and second fuel lines with a pair of inlets to receive the fuel from the first and second fuel lines and a single outlet downstream from the pair of inlets; and
      a dispensing end positioned downstream from the single outlet.

2. The portable fueling trailer of claim 1, wherein a first one of the filters is located on the first fuel line and a second one of the filters is located on the second fuel line.

3. The portable fueling trailer of claim 1, wherein one of the filters is a particulate filter, a second one of the filters is an organic filter, and a third one of the filters is a coalescing filter to remove water from the fuel.

4. The portable fueling trailer of claim 1, further comprising a return fuel line that extends between the fuel system downstream from the single outlet and the fuel tank, the return fuel line configured to return the fuel to the fuel tank after the fuel has moved through the fuel system.

5. The portable fueling trailer of claim 4, further comprising a valve positioned at an intersection of the return fuel line and the fuel system, the valve configured to direct the fuel towards one of the dispensing end and the return fuel line.

6. The portable fueling trailer of claim 1, further comprising an input line that connects to the fuel system downstream from the fuel tank and upstream from the plurality of filters, the input line configured to introduce outside fuel into the fuel system.

7. The portable fueling trailer of claim 6, further comprising an input line pump positioned on the input line to move the outside fuel along the input line and into the fuel system.

8. The portable fueling trailer of claim 6, further comprising a valve positioned along the fuel system between the fuel tank and the input line, the valve preventing the outside fuel from moving upstream along the fuel system and into the fuel tank.

9. The portable fueling trailer of claim 1, further comprising:
sensors positioned along the fuel lines and the fuel tank; and
a control system comprising a processing circuit and a communications interface circuit, the control system configured to receive signals from the sensors and adjust one or more of the pumps to adjust the flow rate of the fuel moving through the fuel system.

10. The portable fueling trailer of claim 1, further comprising a hitch positioned on a front of the frame and configured to be attached to a vehicle.

11. The portable fueling trailer of claim 9, wherein the control system is configured to receive signals from a remote source and in response to the signals move the fuel from the fuel tank and through the fuel system and return the fuel to the fuel tank.

12. The portable fueling trailer of claim 9, wherein the control system is configured to periodically move the fuel through the fuel system and return the fuel to the fuel tank to maintain the fuel in a usable state.

13. A portable fueling trailer comprising:
a frame with wheels;
a fuel tank mounted to the frame, the fuel tank comprising an enclosed interior space to contain fuel; and
a fuel system to move the fuel from the fuel tank, the fuel system comprising:
first and second filters that remove contaminants from the fuel;
redundant first and second fuel lines positioned downstream from the first and second filters, each of the first and second fuel lines having a pump and a third filter configured to remove additional contaminants from the fuel;
a connector with a pair of inlets to receive the fuel from the first and second fuel lines and a single outlet downstream from the pair of inlets; and
a dispensing end positioned downstream from the connector to dispense the fuel.

14. The portable fueling trailer of claim 13, further comprising a return line that extends between the fuel system downstream from the single outlet and the fuel tank, the return line configured to return the fuel to the fuel tank that has moved through the fuel system.

15. The portable fueling trailer of claim 13, further comprising an input line that connects to the fuel system downstream from the fuel tank and upstream from the filters, the input line configured to introduce outside fuel into the fuel system.

16. The portable fueling trailer of claim 13, further comprising a control system comprising a processing circuit and a communications interface circuit, the control system configured to receive signals from sensors in the fuel system and adjust one or more of the pumps to adjust the flow rate of the fuel moving through the fuel system.

17. A method of using a portable fueling trailer, the method comprising:
wheeling a fueling trailer to a desired geographic location;
moving fuel from a fuel tank in the fueling trailer through a plurality of filters and removing contaminants from the fuel;
moving with a first pump a first portion of the fuel through a first fuel line and filtering the first portion of the fuel;
while moving the first portion of the fuel through the first fuel line, simultaneously pumping with a second pump a remaining second portion of the fuel through a second fuel line and filtering the second portion of the fuel; and
moving the first and second portions of the fuel from the first and second fuel lines and into a single fuel line; and
dispensing the fuel from the single fuel line.

18. The method of claim 17, further comprising prior to dispensing the fuel from the single fuel line, moving the fuel from the single fuel line and through a return line and back into the fuel tank.

19. The method of claim 17, further comprising introducing outside fuel into an input line and into the fueling trailer downstream from the fuel tank and upstream from the plurality of filters and moving the outside fuel through the plurality of filters.

20. The method of claim 19, further comprising preventing the outside fuel from moving into the fuel tank prior to moving the outside fuel through the plurality of filters.

* * * * *